(12) United States Patent  
Liu

(10) Patent No.: US 9,244,305 B2
(45) Date of Patent: Jan. 26, 2016

(54) LIQUID CRYSTAL PANEL AND LIQUID CRYSTAL DISPLAY

(71) Applicant: Au Optronics Corporation, Hsinchu (TW)

(72) Inventor: Yun-I Liu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/187,338

(22) Filed: Feb. 24, 2014

(65) Prior Publication Data

US 2015/0070624 A1 Mar. 12, 2015

(30) Foreign Application Priority Data

Sep. 11, 2013 (TW) .............................. 102132855 A

(51) Int. Cl.
  *C09K 19/00* (2006.01)
  *G02F 1/1335* (2006.01)
  *F21V 8/00* (2006.01)

(52) U.S. Cl.
  CPC ........ *G02F 1/133514* (2013.01); *G02B 6/0011* (2013.01); *G02F 1/133615* (2013.01); *G02F 2001/133614* (2013.01); *Y10T 428/10* (2015.01); *Y10T 428/1041* (2015.01)

(58) Field of Classification Search
  CPC .................... G02F 1/133371; G02F 1/133514; G02F 1/133519; G02F 1/133615; G02F 1/133603; G02F 1/133621; G02F 2001/133614; G02F 2001/133613; G02B 5/201; G02B 5/223; G02B 5/22; Y10T 428/10; Y10T 428/1036; Y10T 428/1041

USPC ......... 428/1.1, 1.3, 1.31; 349/62, 70, 97, 106, 349/107, 122, 160; 359/891; 430/7, 270.1, 430/281.1; 257/13, E33.061; 362/602, 614
  See application file for complete search history.

(56) References Cited

U.S. PATENT DOCUMENTS

| | | | |
|---|---|---|---|
| 4,632,514 A | 12/1986 | Ogawa et al. | |
| 2008/0084706 A1 | 4/2008 | Roshan et al. | |
| 2012/0256163 A1* | 10/2012 | Yoon et al. ...................... | 257/13 |
| 2012/0275045 A1 | 11/2012 | Chen et al. | |
| 2013/0120683 A1 | 5/2013 | Lin et al. | |
| 2015/0042930 A1* | 2/2015 | Ogawa et al. ................. | 349/106 |

FOREIGN PATENT DOCUMENTS

JP 5299593 B1 * 9/2013

* cited by examiner

*Primary Examiner* — Ruiyun Zhang
(74) *Attorney, Agent, or Firm* — Jianq Chyun IP Office

(57) ABSTRACT

A liquid crystal panel and a liquid crystal display including the liquid crystal panel and a backlight unit are provided. The backlight unit includes an exciting light source and a quantum dot fluorescent material. An emission spectrum of the backlight unit at a wavelength from 400 nm to 500 nm, from 500 nm to 580 nm and from 580 nm to 780 nm has relative maximum brightness peaks BL1, BL2 and BL3, respectively, wherein BL2/BL1>0.65, and BL2/BL3>1. The liquid crystal panel is disposed above the backlight unit, and has red pixel regions, green pixels regions and blue pixel regions. A cell gap in the red pixel regions of the liquid crystal panel is bigger than a cell gap in the green pixel regions of the liquid crystal panel and a cell gap in the blue pixel regions of the liquid crystal panel.

10 Claims, 3 Drawing Sheets

LIQUID CRYSTAL PANEL AND LIQUID CRYSTAL DISPLAY

CROSS-REFERENCE TO RELATED APPLICATION

This application claims the priority benefit of Taiwan application serial no. 102132855, filed on Sep. 11, 2013. The entirety of the above-mentioned patent application is hereby incorporated by reference herein and made a part of this specification.

FIELD OF THE INVENTION

The invention relates to a liquid crystal panel and a liquid crystal display (LCD), and more particularly, to a liquid crystal display having a quantum dot fluorescent material.

DESCRIPTION OF RELATED ART

Since a LCD has advantages such as a compact size, high picture quality, low power consumption and no radiation, it has become a mainstream of display products in recently years. In general, a backlight unit commonly used in the liquid crystal display is a cold-cathode fluorescent lamp (CCFL) backlight unit and a light emitting diode (LED) backlight unit and the like, wherein the LED backlight unit is gradually applied on portable displays and TV backlight modules for its advantages such as energy saving, compact sizes and fast response speed. In general, the commonly used white LED package usually adopts a blue LED chip together with yttrium aluminum garnet (YAG) powder, which has advantages of being easily packaged and a compact size.

On the other hand, in recent years, a quantum dot fluorescent material has gradually replaced conventional organic fluorescent materials such as YAG powder and has been applied on the LED and the backlight module. Specifically, the quantum dot fluorescent material is a quasi-zero-dimensional nanometer material consisted of several or several dozens of atoms. Since a movement of electrons inside the quantum dot fluorescent material in the three-dimensional space is confined, optical properties thereof are greatly different from a bulk type fluorescent material. For example, after being irradiated by the same exciting light source, quantum dot fluorescent materials in different sizes emit a second light beam in different wavelength ranges. If the quantum dot fluorescent materials in different sizes are mixed and the properly mixed quantum dot fluorescent materials are irradiated by the same exciting light source, second light beams in different wavelength ranges are produced at the same time.

In comparison with the conventional organic fluorescent materials, emissions of the quantum dot fluorescent materials have better light emitting efficiency. Therefore, if the quantum dot fluorescent material is applied to a backlight unit of a liquid crystal display, it helps to enhance color saturation of the liquid crystal display. However, although the quantum dot fluorescent material can enhance color saturation of a liquid crystal display, it faces an issue of a shifting of a chromatic coordinate of a white dot. Consequently, a solution of how to improve a shifting of a chromatic coordinate of a white dot caused by the quantum dot fluorescent material is highly desired.

SUMMARY OF THE INVENTION

The invention provides a liquid crystal panel having great color saturation and white color display performance.

The invention provides a liquid crystal display having great color saturation and white color display performance.

The liquid crystal panel of the invention has a plurality of red pixel regions, a plurality of green pixel regions and a plurality of blue pixel regions. A cell gap in the red pixel regions of the liquid crystal panel is bigger than a cell gap in the green pixel regions of the liquid crystal panel, and the cell gap in the red pixel regions of the liquid crystal panel is bigger than a cell gap in the blue pixel regions of the liquid crystal panel.

The liquid crystal display of the invention includes a backlight unit and the liquid crystal panel. The backlight unit includes an exciting light source and a quantum dot fluorescent material. An emission spectrum of the backlight unit at a wavelength from 400 nm to 500 nm has a relative maximum brightness peak BL1, an emission spectrum of the backlight unit at a wavelength from 500 nm to 580 nm has a relative maximum brightness peak BL2, and an emission spectrum of the backlight unit at a wavelength from 580 nm to 780 nm has a relative maximum brightness peak BL3, wherein $BL2/BL1>0.65$, and $BL2/BL3>1$.

In view of the aforesaid, in the liquid crystal panel and the liquid crystal display illustrated in the exemplary embodiments of the invention, a condition that a shifting of a chromatic coordinate of a white dot caused by the quantum dot fluorescent material can be improved by controlling the cell gaps in the red pixel regions, the green pixel regions and the blue pixel regions, and great color saturation and a desired location of chromatic coordinate of a white dot can further be obtained.

To make the aforesaid features and advantages of the invention more comprehensible, several embodiments accompanied with drawings are described in details as follows.

DESCRIPTION OF EMBODIMENTS

Figure 1A:
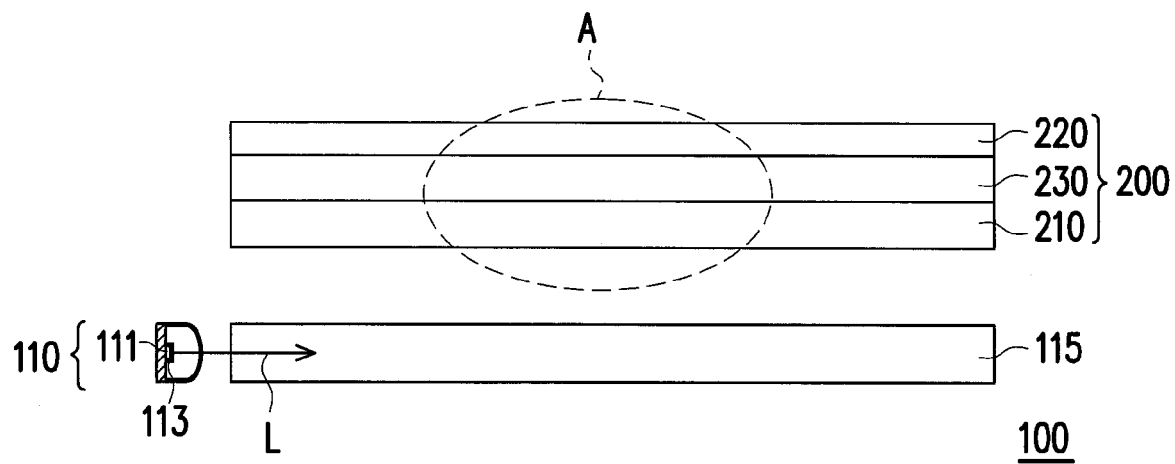
FIG. 1A illustrates a schematic view of a liquid crystal display according to an embodiment of the invention.
Figure 1B:
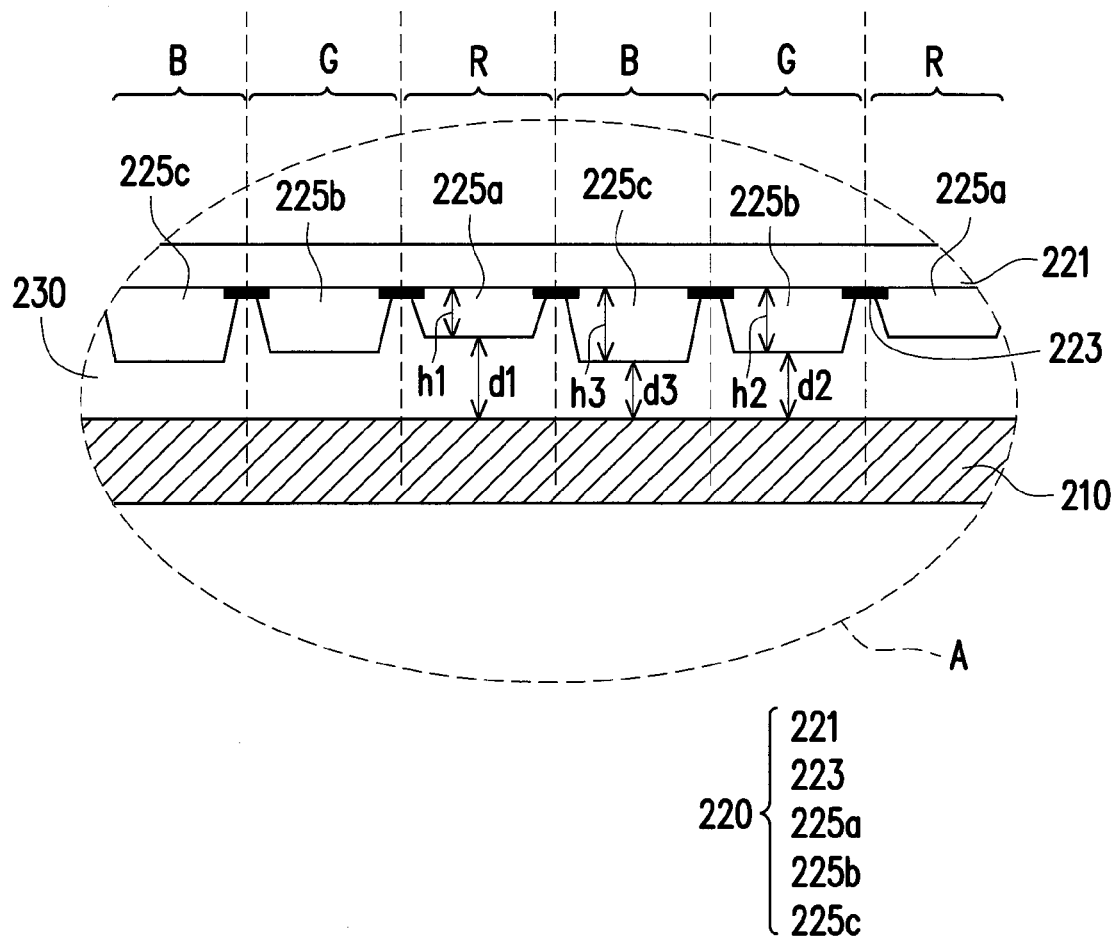
FIG. 1B is a partial enlarged view of an area A of a liquid crystal panel depicted in FIG. 1A.

FIG. 1A is a schematic view of a liquid crystal display according to an embodiment of the invention, while FIG. 1B is an enlarged partial view of an area A of a liquid crystal panel depicted in FIG. 1A. Referring to FIG. 1A, a LCD 100 includes a backlight unit 110 and a liquid crystal panel 200. For example, in the present embodiment, the backlight unit 110 is an edge type backlight unit including an exciting light source 111 and a quantum dot fluorescent material 113. In addition, in the present embodiment, the backlight unit 110 further includes a light-guide plate 115, such that an illumination beam L is transmitted to the liquid crystal panel 200 for providing light required for displaying. However, the invention is not limited herein. In another embodiment not illustrated in the drawings, the backlight unit 110 can also be a direct type backlight unit, which also includes the exciting light source 111 and the quantum dot fluorescent material 113. A difference only lies in that the exciting light source 111 and the quantum dot fluorescent material 113 are disposed directly below the liquid crystal panel 200 so as to provide light required for displaying.

On the other hand, as shown in FIG. 1A, the liquid crystal panel 200 of the present embodiment includes an active device array substrate 210, a color filter substrate 220 and a liquid crystal layer 230. The liquid crystal layer 230 is disposed between the active device array substrate 210 and the color filter substrate 220. For example, as shown in FIG. 1B, the color filter substrate 220 of the present embodiment includes a first substrate 221, a black matrix (BM) 223, a plurality of red filter films 225a, a plurality of green filter films 225b and a plurality of blue filter films 225c, wherein the black matrix 223, the red filter films 225a, the green filter films 225b and the blue filter films 225c all are disposed on the first substrate 221. Furthermore, the red filter films 225a, the green filter films 225b and the blue filter films 225c cover portions of the black matrix 223. Moreover, for the purpose of convenient indications, FIG. 1B illustrates mainly a relative relation among a thickness of each film such as the red filter films 225a, the green filter films 225b, the blue filter films 225c and the black matrix 223, rather than illustrating substantial sizes.

For example, in the present embodiment, a plurality of red pixel regions R, a plurality of green pixel regions G and a plurality of blue pixel regions B can be defined according to positions of the green filter films 225b, the blue filter films 225c and the red filter films 225a. In other words, the liquid crystal panel 200 has the plurality of red pixel regions R, the plurality of green pixel regions G and the plurality of blue pixel regions B. Furthermore, in the present embodiment, a thickness h1 of the red filter films 225a is thinner than a thickness h2 of the green filter films 225b, and the thickness h1 of the red filter films 225a is thinner than a thickness h3 of the blue filter films 225c. Consequently, distances between the active device array substrate 210 and the red filter films 225a, the green filter films 225b and the blue filter films 225c of the color filter substrate 220 are not equal.

That is to say, cell gaps d1, d2 and d3 in the red pixel regions R, the green pixel regions G and the blue pixel regions B of the liquid crystal panel 200 are different among one another. More specifically, the cell gap d1 in the red pixel regions R of the liquid crystal panel 200 is bigger than the cell gap d2 in the green pixel regions G of the liquid crystal panel 200, and the cell gap d1 in the red pixel regions R of the liquid crystal panel 200 is bigger than the cell gap d3 in the blue pixel regions B of the liquid crystal panel 200. In addition, in the present embodiment, a difference between the cell gap d1 in the red pixel regions R of the liquid crystal panel 200 and the cell gap d3 in the blue pixel regions B of the liquid crystal panel 200 is larger than 0.3 micrometer (m). It should be noted that each scope of the above parameters are only exemplary and not intended to limit the invention.

Accordingly, wavelengths and brightness of light passing through the red pixel regions R, the green pixel regions G and the blue pixel regions B can be adjusted by controlling the cell gaps d1, d2 and d3 in the red pixel regions R, the green pixel regions G and the blue pixel regions B. Further, a condition that a shifting of a chromatic coordinate of a white dot caused by the quantum dot fluorescent material 113 can be improved, and great color saturation and a desired location of a chromatic coordinate of a white dot can be obtained.

On the other hand, in the present embodiment, the liquid crystal panel 200 and the liquid crystal display 100 can also be employed with a material selected for the blue filter films 225c of the color filter substrate 220, such that in a CIE 1931 chromaticity diagram, a value of x coordinate of the light is smaller than 0.155, a value of y coordinate of the light is smaller than 0.06, and a brightness value Y of the light is larger than 8. Consequently, the liquid crystal panel 200 and the liquid crystal display 100 have great color saturation and a desired location of a chromatic coordinate of a white dot. Further illustrations will be provided in the accompanying FIG. 2.

Figure 2:
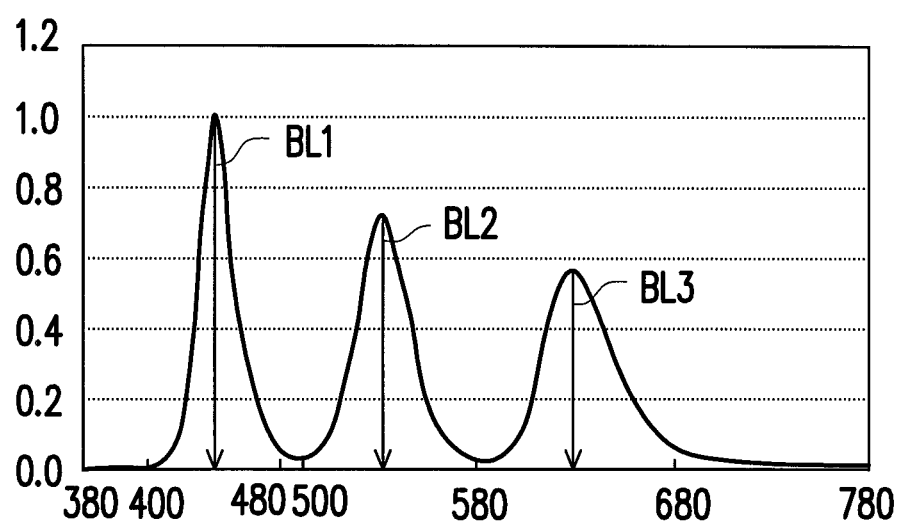
FIG. 2 illustrates an emission spectrum a backlight unit of FIG. 1A.

FIG. 2 illustrates an emission spectrum a backlight unit of FIG. 1A. Referring to FIG. 2, in the present embodiment, an emission spectrum of the backlight unit 110 at a wavelength from 400 nm to 500 nm has a relative maximum peak BL1, an emission spectrum of the backlight unit 110 at a wavelength from 500 nm to 580 nm has a relative maximum peak BL2, and an emission spectrum of the backlight unit 110 at a wavelength from 580 nm to 780 nm has a relative maximum brightness peak BL3, wherein BL2/BL1>0.65, and BL2/BL3>1.

On the other hand, in the present embodiment, the blue filter films 225c, for example, can include a first pigment and a purple dye, or the blue filter films 225c can include a blue dye and the purple dye. For example, the first pigment of the present embodiment is a 13 type cyanine blue pigment having a formula as shown below:

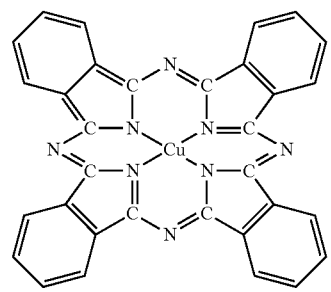

The followings are several specific embodiments illustrating constitutes of materials of the blue filter films 225c. However, the invention is not limited to the data listed below. It should be known to those ordinarily skilled in the art that various modifications and variations can be made to the parameters or settings of the invention without departing from the scope or spirit of the invention.

TABLE 1

| Components | Weight % |
|---|---|
| First Pigment | 0~6% |
| Purple Dye | 0~10% |
| Alkaline Polymer | 5~10% |
| Cross-linking Monomer | 5~10% |
| Photo Initiator | <1% |
| Additive | <1% |
| Solvent | 70~85% |

TABLE 2

| Components | Weight % |
|---|---|
| First Pigment | 0~6% |
| Purple Dye | 0~6% |
| Alkaline Polymer | 5~10% |
| Cross-linking Monomer | 5~10% |
| Photo Initiator | <1% |
| Additive | <1% |
| Solvent | 70~80% |

TABLE 3

| Components | Weight % |
| --- | --- |
| First Pigment | 2~6% |
| Purple Dye | 2~6% |
| Alkaline Polymer | 5~8% |
| Cross-linking Monomer | 5~8% |
| Photo Initiator | 0.2%~0.6% |
| Additive | 0.1%~0.2% |
| Solvent | 70~80% |

The above Table 1 to Table 3 disclose specific embodiments that materials of three types of the blue filter films 225c are a combination of the first pigment, the purple dye, the alkaline polymer, the cross-linking monomer, the photo initiator, the additive and the solvent, wherein the first pigment and the purple dye can be used to display specific colors in a liquid crystal display 100. The alkaline polymer can be used for stabilizing the first pigment and can make the first pigment to be solved in a developer. The cross-linking monomer can be used for stabilizing a structure of the blue filter films 225c. The photo initiator can be used for initializing the reaction. The additive can be used to enhance coating, exposing and developing performance. For example, in the present embodiment, the additive can be a surfactant or a heat resisting agent. The solvent can be used to enhance coating performance. For example, in the present embodiment, the solvent can be propylene glycol monomethyl ether acetate (PGMEA) or various kinds of solvent containing alcohol, ester, ether and ketone. In addition, in the aforesaid embodiment, an usage amount of the first pigment is from 0 wt % to 6 wt %, and an usage amount of the purple dye is from 0 wt % to 10 wt %. Preferably, the usage amount of the first pigment is from 0 wt % to 6 wt %, and the usage amount of the purple dye is from 0 wt % to 6 wt %. More preferably, the usage amount of the first pigment is from 2 wt % to 6 wt %, and the usage amount of the purple dye is from 2 wt % to 6 wt %.

TABLE 4

| Components | Weight % |
| --- | --- |
| Blue Dye | 2~6% |
| Purple Dye | 2~6% |
| Alkaline Polymer | 5~8% |
| Cross-Cross-linking Monomer | 5~8% |
| Photo Initiator | 0.2%~0.6% |
| Additive | 0.1%~0.2% |
| Solvent | 70~80% |

Table 4 discloses another embodiment illustrating that materials of the blue filter films 225c are a combination of the blue dye, the purple dye, the alkaline polymer, the cross-linking monomer, the photo initiator, the additive and the solvent, wherein the blue dye can also be used to display specific colors in the liquid crystal display 100. Effects of the purple dye, the alkaline polymer, the cross-linking monomer, the photo initiator, the additive and the solvent are similar to those disclosed in the embodiments of Table 1 to Table 3. For detailed descriptions, please refer to their related paragraphs, as they are not reiterated herein.

By applying the blue filter films 225c in the previous embodiment, after a light provided by the backlight unit 110 passed through the blue pixel regions B, in a CIE 1931 chromaticity diagram, a value of x coordinate of the light is smaller than 0.155, a value of y coordinate of the light is smaller than 0.06, and a brightness value Y of the light is larger than 8. Consequently, the liquid crystal panel 200 and the liquid crystal display 100 have great color saturation and a desired location of chromatic coordinate of a white dot.

On the other hand, in the aforesaid embodiment, although the cell gaps d1, d2 and d3 in the red pixel regions R, the green pixel regions G and the blue pixel regions B can be adjusted by controlling the thicknesses h1, h2 and h3 of the red filter films 225a, the green filter films 225b and the blue filter films 225c, the invention is not limited herein. In other embodiments, the cell gaps d1, d2 and d3 in the red pixel regions R, the green pixel regions G and the blue pixel regions B of the liquid crystal panel 200 can also be different from one another by using other methods. Further illustrations will be provided in the accompanying FIG. 3A to FIG. 3B.

Figure 3A:
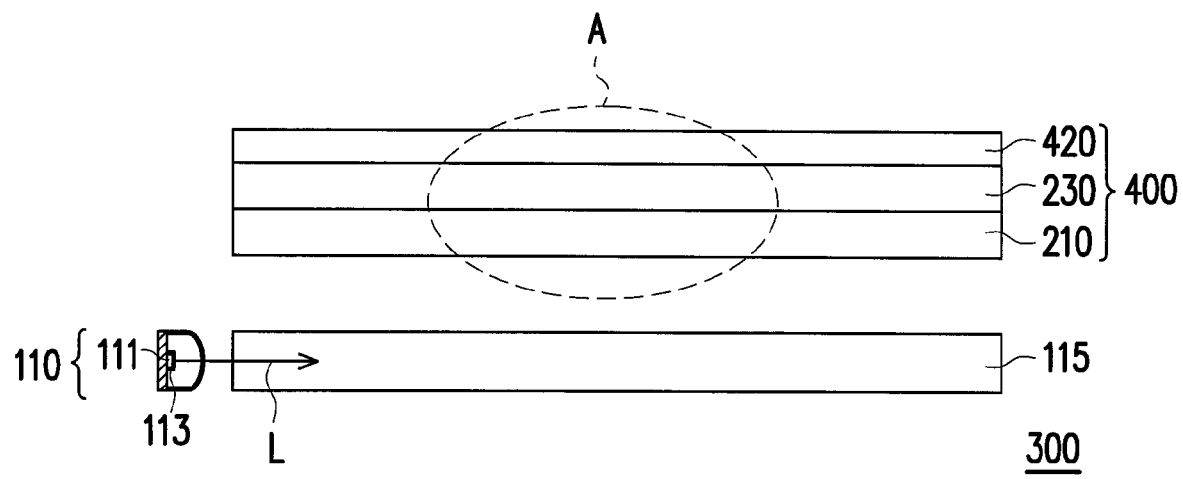
FIG. 3A illustrates a schematic view of a liquid crystal display according to another embodiment of the invention.
Figure 3B:
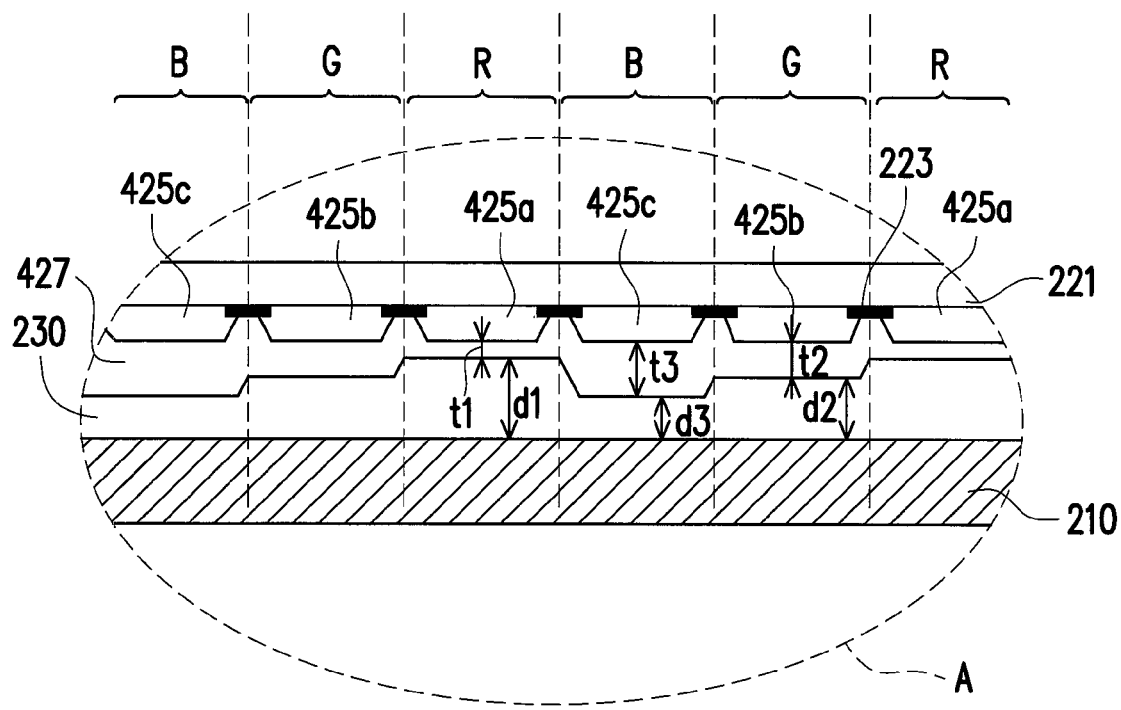
FIG. 3B is a partial enlarged view of an area B of a liquid crystal panel depicted in FIG. 3A.

FIG. 3A is a schematic view of a structure of a liquid crystal display according to another embodiment of the invention, while FIG. 3B is an enlarged partial view of an area A of the liquid crystal panel depicted in FIG. 3A. Referring to FIG. 3A and FIG. 3B, a liquid crystal display 300 of the present embodiment is similar to the liquid crystal display 100 of FIG. 1A, and discrepancies between the two displays are described below. As shown in FIG. 3B, in the present embodiment, a color filter substrate 420 of the liquid crystal display 300 further has a covering layer 427, wherein the covering layer 427 covers red filter films 425a, green filter films 425b and blue filter films 425c. For example, in the present embodiment, the cell gaps d1, d2 and d3 in the red pixel regions R, the green pixel regions G and the blue pixel regions B can be adjusted by controlling thicknesses of the covering layer 427 in different regions. Specifically, in the present embodiment, a thickness t1 of a portion of the covering layer 427 on the red filter films 425a is thinner than a thickness t2 of a portion of the covering layer 427 on the green filter films 425b, and the thickness t1 of a portion of the covering layer 427 on the red filter films 425a is thinner than a thickness t3 of a portion of the covering layer 427 on the blue filter films 425c. Moreover, for the purpose of convenient indications, FIG. 3B also illustrates mainly a relative relation of a thickness of the covering layer with respect to each filter film, rather than illustrating substantial sizes.

Accordingly, the cell gaps d1, d2 and d3 in the red pixel regions R, the green pixel regions G and the blue pixel regions B of a liquid crystal panel 400 and the liquid crystal display 300 can be different from one another, and a relation of the cell gaps is d1>d2 and d1>d3 so as to adjust wavelengths and brightness of a light passing through the red pixel regions R, the green pixel regions G and the blue pixel regions B. Further, a condition that a shifting of a chromatic coordinate of a white dot caused by the quantum dot fluorescent material 113 can be improved, and great color saturation and a desired location of chromatic coordinate of a white dot can be obtained.

In summary, in the liquid crystal panel and the liquid crystal display illustrated in the embodiments of the invention, a condition that a shifting of a chromatic coordinate of a white dot caused by the quantum dot fluorescent material can be improved by controlling the cell gaps in the red pixel regions, the green pixel regions and the blue pixel regions, and great color saturation and a desired location of a chromatic coordinate of a white dot can further be obtained. Additionally, display effects can further be enhanced by selecting a backlight unit having a proper emission spectrum of a relative maximum brightness peak, or by selecting a proper material of a blue filter film.

Although the invention has been disclosed with reference to the aforesaid embodiments, they are not intended to limit the invention. It will be apparent to those skilled in the art that various modifications and variations to the described embodiments may be made without departing from the scope or spirit of the invention. Accordingly, the scope of the invention will be defined by the following claims.

What is claimed is:

1. A liquid crystal display, comprising:

a backlight unit comprising an exciting light source and a quantum dot fluorescent material, wherein an emission spectrum of the backlight unit at a wavelength from 400 nm to 500 nm has a relative maximum peak BL1, an emission spectrum of the backlight unit at a wavelength from 500 nm to 580 nm has a relative maximum peak BL2, and an emission spectrum of the backlight unit at a wavelength from 580 nm to 780 nm has a relative maximum brightness peak BL3, wherein BL2/BL1>0.65, and BL2/BL3>1; and a liquid crystal panel disposed above the backlight unit, the liquid crystal panel having a plurality of red pixel regions, a plurality of green pixel regions and a plurality of blue pixel regions, wherein a cell gap in the red pixel regions of the liquid crystal panel is bigger than a cell gap in the green pixel regions of the liquid crystal panel, and the cell gap in the red pixel regions of the liquid crystal panel is bigger than a cell gap in the blue pixel regions of the liquid crystal panel.

2. The liquid crystal display as claimed in claim 1, wherein the liquid crystal panel comprises:

an active device array substrate;

a color filter substrate having a plurality of red filter films, a plurality of green filter films and a plurality of blue filter films, wherein a thickness of the red filter films is thinner than a thickness of the green filter films, and the thickness of the red filter films is thinner than a thickness of the blue filter films; and a liquid crystal layer disposed between the active device array substrate and the color filter substrate.

3. The liquid crystal display as claimed in claim 1, wherein the liquid crystal panel comprises:

an active device array substrate;

a color filter substrate having a covering layer, a plurality of red filter films, a plurality of green filter films and a plurality of blue filter films, wherein the covering layer covers the red filter films, the green filter films and the blue filter films, a thickness of a portion of the covering layer on the red filter films is thinner than a thickness of a portion of the covering layer on the green filter films, and the thickness of the portion of the covering layer on the red filter films is thinner than a thickness of a portion of the covering layer on the blue filter films; and a liquid crystal layer disposed between the active device array substrate and the color filter substrate.

4. The liquid crystal display as claimed in claim 1, wherein the liquid crystal panel comprises:

an active device array substrate;

a color filter substrate having a plurality of red filter films, a plurality of green filter films and a plurality of blue filter films, wherein the blue filter films comprise:

a first pigment and a purple dye, wherein the first pigment is

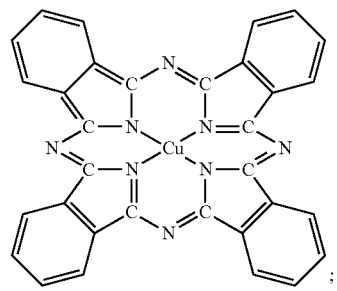

or a blue dye and the purple dye; and a liquid crystal layer disposed between the active device array substrate and the color filter substrate.

5. The liquid crystal display as claimed in claim 1, wherein a difference between the cell gap in the red pixel regions of the liquid crystal panel and the cell gap in the blue pixel regions of the liquid crystal panel is larger than 0.3 micrometer.

6. The liquid crystal display as claimed in claim 1, wherein, after light provided by the backlight unit passes through the blue pixel regions, in a CIE 1931 chromaticity diagram, a value of x coordinate of the light is smaller than 0.155, a value of y coordinate of the light is smaller than 0.06, and a brightness value Y is larger than 8.

7. A liquid crystal panel having a plurality of red pixel regions, a plurality of green pixel regions and a plurality of blue pixel regions, wherein a cell gap in the red pixel regions of the liquid crystal panel is bigger than a cell gap in the green pixel regions of the liquid crystal panel, and the cell gap in the red pixel regions of the liquid crystal panel is bigger than a cell gap in the blue pixel regions of the liquid crystal panel, wherein the liquid crystal panel comprises:

an active device array substrate;

a color filter substrate having a plurality of red filter films, a plurality of green filter films and a plurality of blue filter films, wherein the blue filter films comprise:

a first pigment and a purple dye, wherein the first pigment is or a blue dye and the purple dye; and a liquid crystal layer disposed between the active device array substrate and the color filter substrate, wherein when a light passes through the blue pixel regions, in a CIE 1931 chromaticity diagram, a value of x coordinate of the light is smaller than 0.155, a value of y coordinate of the light is smaller than 0.06, and a brightness value Y is larger than 8.

8. The liquid crystal panel as claimed in claim 7, wherein a thickness of the red filter films is thinner than a thickness of the green filter films, and the thickness of the red filter films is thinner than a thickness of the blue filter films.

9. The liquid crystal panel as claimed in claim 7, wherein the color filter substrate further comprises:
a covering layer, wherein the covering layer covers the red filter films, the green filter films and the blue filter films, a thickness of a portion of the covering layer on the red filter films is thinner than a thickness of a portion of the covering layer on the green filter films, and the thickness of a portion of the covering layer on the red filter films is thinner than a thickness of a portion of the covering layer on the blue filter films.

10. The liquid crystal panel as claimed in claim 7, wherein a difference between the cell gap in the red pixel regions of the liquid crystal panel and the cell gap in the blue pixel regions of the liquid crystal panel is larger than 0.3 micrometer.

* * * * *